(12) United States Patent  
Mark

(10) Patent No.: US 7,869,920 B2  
(45) Date of Patent: Jan. 11, 2011

(54) DEVICE AND METHOD FOR CONTROLLING CONTROL APPLIANCES IN AN ON-BOARD SUPPLY SYSTEM OF A MOTOR VEHICLE

(75) Inventor: Wolfram Mark, Wolfersdorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 15 days.

(21) Appl. No.: 11/499,807

(22) Filed: Aug. 7, 2006

(65) Prior Publication Data

US 2007/0032916 A1 Feb. 8, 2007

Related U.S. Application Data

(63) Continuation of application No. PCT/EP2004/013815, filed on Dec. 4, 2004.

(30) Foreign Application Priority Data

Feb. 5, 2004 (DE) ........................ 10 2004 005 680

(51) Int. Cl.  
*G06F 7/00* (2006.01)  
*G06F 13/42* (2006.01)

(52) U.S. Cl. ............................... 701/36; 701/1; 701/29; 701/30; 701/31; 701/32; 701/33; 701/35; 701/114; 701/115; 340/438; 340/445; 340/825; 340/3.1; 340/3.2; 340/3.21; 340/3.3; 340/3.32; 340/3.5; 340/3.52

(58) Field of Classification Search ............ 701/1, 701/29, 30, 31, 32, 33, 35, 36, 114, 115; 340/438, 445, 825, 3.1, 3.2, 3.21, 3.3, 3.32, 340/3.5, 3.52

See application file for complete search history.

(56) References Cited

U.S. PATENT DOCUMENTS 4,794,521 A * 12/1988 Ziegler et al. ............... 711/130

(Continued)

FOREIGN PATENT DOCUMENTS

DE 41 10 372 A1 10/1991

(Continued)

OTHER PUBLICATIONS

International Search Report dated Jul. 29, 2005.

(Continued)

*Primary Examiner*—Jack Keith  
*Assistant Examiner*—Chuong P Nguyen  
(74) *Attorney, Agent, or Firm*—Crowell & Moring LLP

(57) ABSTRACT

An arrangement and method for controlling control devices in an on-board wiring system of a motor vehicle are provided, in which the on-board wiring system has a bus system divided into sub-networks of buses with groups of control devices for controlling operating sequences, and in which the control devices are controllable by way of at least one access to a data transmission via a test instrument. A multifunctional data transmission device is connected to the input side of the bus system, to which data transmission device the sub-networks are connectable directly in parallel and are controllable in a parallel manner with respect to time by way of several control devices distributed on the connected sub-networks. The sub-networks may be structured via a hierarchically defined criteria priority, which takes into account the communication required in the operation between the individual control devices within the sub-networks and between the sub-networks, as well as the data quantities to be transmitted to the individual control devices.

19 Claims, 3 Drawing Sheets

U.S. PATENT DOCUMENTS

| | | | | | |
|---|---|---|---|---|---|
| 4,821,265 | A | * | 4/1989 | Albal et al. | 370/469 |
| 4,949,338 | A | * | 8/1990 | Albal et al. | 370/462 |
| 5,625,555 | A | * | 4/1997 | Davis | 701/1 |
| 5,652,911 | A | * | 7/1997 | Van Venrooy et al. | 701/1 |
| 6,038,685 | A | * | 3/2000 | Bissett et al. | 714/12 |
| 6,107,696 | A | * | 8/2000 | Peter et al. | 307/31 |
| 6,356,823 | B1 | * | 3/2002 | Iannotti et al. | 701/35 |
| 6,359,554 | B1 | * | 3/2002 | Skibinski et al. | 340/438 |
| 6,405,106 | B1 | * | 6/2002 | Sheth et al. | 701/1 |
| 6,430,662 | B1 | * | 8/2002 | Hurich et al. | 711/162 |
| 6,647,323 | B1 | * | 11/2003 | Robinson et al. | 701/1 |
| 6,654,669 | B2 | * | 11/2003 | Eisenmann et al. | 701/1 |
| 6,907,445 | B2 | * | 6/2005 | Pellegrino et al. | 709/201 |
| 6,978,198 | B2 | * | 12/2005 | Shi | 701/33 |
| 7,165,123 | B2 | * | 1/2007 | Hindman | 710/3 |
| 7,184,867 | B2 | * | 2/2007 | Okuyama | 701/36 |
| 7,356,389 | B2 | * | 4/2008 | Holst et al. | 701/3 |
| 7,359,775 | B2 | * | 4/2008 | Strege et al. | 701/29 |
| 2001/0002449 | A1 | * | 5/2001 | Eisenmann et al. | 701/1 |
| 2003/0046437 | A1 | * | 3/2003 | Eytchison et al. | 709/250 |
| 2003/0158640 | A1 | * | 8/2003 | Pillar et al. | 701/33 |
| 2003/0167345 | A1 | * | 9/2003 | Knight et al. | 709/249 |
| 2003/0182033 | A1 | * | 9/2003 | Underdahl et al. | 701/29 |
| 2003/0225485 | A1 | | 12/2003 | Fritz et al. | |
| 2004/0030748 | A1 | | 2/2004 | Griessbach | |
| 2004/0078126 | A1 | | 4/2004 | Huber et al. | |
| 2005/0131595 | A1 | * | 6/2005 | Luskin et al. | 701/29 |
| 2006/0036356 | A1 | * | 2/2006 | Rasin et al. | 701/1 |
| 2006/0217855 | A1 | * | 9/2006 | Chinnadurai et al. | 701/29 |

FOREIGN PATENT DOCUMENTS

| | | |
|---|---|---|
| DE | 196 22 529 A1 | 12/1997 |
| DE | 197 36 231 A1 | 2/1999 |
| DE | 197 50 662 C2 | 5/1999 |
| DE | 198 05 464 A1 | 8/1999 |
| DE | 198 39 680 A1 | 3/2000 |
| DE | 199 47 407 A1 | 5/2001 |
| DE | 101 27 201 A1 | 2/2002 |
| DE | 100 26 246 A1 | 3/2002 |
| DE | 100 60 539 C1 | 6/2002 |
| DE | 101 05 858 A1 | 8/2002 |
| DE | 102 13 165 B3 | 1/2004 |

OTHER PUBLICATIONS

German Search Report dated Oct. 28, 2004.

* cited by examiner

DEVICE AND METHOD FOR CONTROLLING CONTROL APPLIANCES IN AN ON-BOARD SUPPLY SYSTEM OF A MOTOR VEHICLE

CROSS-REFERENCE TO RELATED APPLICATIONS

This application is a continuation of PCT International Application No. PCT/EP2004/013815, filed on Dec. 4, 2004, which claims priority under 35 U.S.C. §119 to German Application No. 10 2004 005 680.3, filed Feb. 5, 2004, the entire disclosures of which are expressly incorporated by reference herein.

BACKGROUND AND SUMMARY OF THE INVENTION

The invention relates to an arrangement for controlling control devices in an on-board wiring system of a motor vehicle, in which the on-board wiring system has a bus system which is divided into sub-networks of buses with groups of control devices for controlling operating sequences in the motor vehicle, and in which the control devices can be controlled by way of at least one access to the data transmission by way of a test instrument.

The invention also relates to a method of controlling control devices in an on-board wiring system of a motor vehicle, by which several control devices for the control of operating sequences for the data transmission, can be addressed by means of at least one test instrument.

The increasing electrification in motor vehicles results in a constantly rising number of control devices for a plurality of different control and monitoring functions and, thus, to a growing complexity of the on-board vehicle wiring systems. The expenditures for the data exchange with external devices for the programming, monitoring or function transmission and for implementing the communication of the control devices among one another are rising correspondingly.

It is known to divide control devices in on-board wiring systems of motor vehicles into groups forming sub-networks and to connect them with data buses. Such on-board wiring systems are described, for example, in German Patent documents DE 198 05 464 A1, DE 197 50 662 C2 and DE 100 60 539 C1, as well as the cross references contained therein. In this case, the data buses are wired to form networks by way of a computer network—the gateway—which controls the information exchange between the individual control devices.

For the communication of the networks or the control device to the outside, usually a central gateway module with a diagnostic access on the input side is provided. An external device, a so-called tester, for controlling the control devices can be connected to this access. By way of the tester, the existing control devices can then be programmed according to known methods, as, for example, known from German Patent document DE 198 39 680 A1. In this case, the programming of the control devices takes place sequentially; that is, the control devices are addressed successively and the on-board wiring system is programmed in steps in a serial manner with respect to the time. In this case, the entire on-board wiring system is considered to be a unit, where each control device receives a different device address. The control devices added in the case of new developments are usually integrated by the linking of additional sub-networks or by the distribution to the existing sub-networks, the basic structure of the vehicle wire systems as a rule being maintained.

It is a disadvantage of the known devices and methods for controlling control devices in on-board wiring systems of motor vehicles that the sequential programming of the control devices is very time-consuming. Because of the previously customary point-to-point connection, a software update (flash), during which large data quantities are to be transmitted, may take several hours and therefore result in high costs. For example, 40 Mbytes are in this case transmitted in 6 hours. Another disadvantage consists of the limited number of available device addresses. As a result, in the case of a large number of control devices, not all devices can be addressed directly, whereby the controlling of the on-board wiring system requires higher electronic and program-related expenditures. In addition, as a result of the "historically" grown, rather suboptimal structure of today's on-board wiring systems, with a relatively arbitrary distribution of the control devices to the different sub-networks, losses of time occur during the conversion of the communication of the control devices among one another in the gateways. With the increasing number of control devices, the time-related expenditures for the description of the data memories of the control units during the vehicle production may rise even more in the future. Finally, it is to be expected that, as a result of the increasing complexity of the mutual networking of the control devices, the operating speed of the vehicle electronic system, as a whole, will decrease.

It is therefore an object of the present invention to increase the effectiveness of the data transmission during the controlling of control devices in on-board wiring systems of motor vehicles and to improve the internal and/or external data communication of the control devices.

According to the invention, a multifunctional data transmission device is connected to the input side of the bus system, to which data transmission device the sub-networks may be connected directly in parallel and by which the several control devices distributed on the connected sub-networks may be controlled in parallel with respect to time.

In the following, the multifunctional data transmission device is also called a CFFS switch ("car file and function server switch"). The data transmission may contain a programming of the control devices and/or a function transmission to the control devices and/or a vehicle diagnosis concerning the control devices. A test instrument, whose construction is basically known, is suitable for the data transmission, which test instrument, for the writing-in or changing of data in the memory of the control devices and/or for the diagnosis for monitoring operating sequences and/or for the transmission of function commands, can feed data to the CFFS switch by way of the access. By use of the CFFS switch, the control devices on different sub-networks can be addressed in parallel and data can be read in. For this purpose, the sub-networks are wired in parallel to the CFFS switch. As a result of the fact that, by use of the CFFS switch, the control devices can be controlled in parallel at the buses, the time consumption for programming the vehicle wiring is considerably reduced.

According to a preferred embodiment of the invention, the access of the data transmission device has at least one wire-bound interface. The wire-bound interface may be constructed as an Ethernet interface, for example.

By way of a wire-bound interface, a data transmission into the vehicle becomes possible at a particularly high transmission rate. As a result of the Ethernet interface, a cost-effective network specification is available for this purpose for the local network of the bus system. The Ethernet interface aids the division of the on-board wiring system into individual buses and permits a fast data transmission (download) of the required data into the CFFS switch with a large bandwidth. The Ethernet technology can also be used as a self-learning system, whereby certain more loaded data buses are treated with a higher priority and such data transmission operations can thereby be implemented in an accelerated manner. As a result of the development pressure in the PC field, a constant further development of the Ethernet technology should also be expected. By means of corresponding adaptations, the CFFS switch can profit from these developments without additional expenditures. However, other modern techniques, such as Universal Serial Bus (USB) interfaces, in the case of which the connected devices are independently detected, or Firewire interfaces, for example, according to IEEE Standard 1394 are also usable. Particularly advantageous, the Firewire technique permits isochronous and asynchronous data traffic with high transmission rates.

According to another preferred embodiment of the invention, the access of the data transmission device has at least one wireless interface.

By use of the wireless access, data concerning the tester can be fed to the motor vehicles simultaneously for several vehicles. This results in a further time saving potential and can be implemented particularly effectively by way of a very universally usable wireless local area network (WLAN). However, the use of the Bluetooth short-range transmission between a device and facilities away from the device, which is known from the PC technology, is also contemplated because, as a rule, short ranges and transmission powers in the mW range will be sufficient.

According to another preferred embodiment of the invention, the data transmission device has an on-board diagnostic access.

On-board diagnostic systems (OBDs) are integrated in modern motor vehicles as an obligatory device for the continuous monitoring of all exhaust-gas-relevant components. The OBD access (OBD box) may be arranged in the CFFS switch. As a result, the expenditures are reduced with respect to costs and space for the OBD system. The relevant emission data of the internal-combustion engine of the motor vehicle may be retrieved by way of the OBD box. The reading-out of the data can take place not only by way of special diagnostic devices but basically also by use of a PC or laptop.

According to another preferred embodiment of the invention, at least one storage medium receiving device for a storage medium is arranged on the data transmission device. The storage medium receiving device may be constructed as an insertion site for a data storage card.

The storage medium receiving device provides the possibility of first externally loading a storage medium by means of the tester and then, if required, inserting it into the CFFS switch. As a result, a data transmission to the control devices is permitted at any arbitrary point in time, independently of whether a tester is currently connected. As a storage medium, memory cards, in connection with a corresponding insertion site, for example, a CompactFlash™ card, are particularly suitable because the latter are available at relative low cost with various storage capacities. The storage medium may also be constructed with a key function as a Personal Digital Assistant (PDA), by means of which personalized data can be transmitted. In principle, other storage media or card types, such as memory sticks, SD card or Smart cards, are also suitable.

The above-mentioned object according to the invention is also achieved in that the sub-networks are structured by use of a hierarchically defined criteria priority, which takes into account the communication required in the operation between the individual control devices within the sub-networks and between the sub-networks, as well as the data quantities to be transmitted to the individual control devices.

By use of the criteria priority taking into account the communication paths and the data quantities during the construction of the sub-network system, particularly the internal communication of the control devices, that is, the communication of the control devices with one another, is significantly improved. This can be implemented, for example, following the top-down approach, which provides a subdivision from "rough" to "fine", and which is basically known from the software development field and is used, for example, for establishing arithmetic programs in the Pascal programming language.

In this approach, a problem can be solved by the repeated decomposition into partial problems by means of an algorithm. For the structuring of the on-board wiring system, the totality of all existing control devices, and the control functions connected therewith, is subdivided according to a sequence of criteria ranging from the general to the detailed. Starting with a general specification, a step-by-step refinement of certain specifications is defined, which leads to a division into an optimal number of buses with assigned control devices. The data traffic between the sub-networks is therefore simplified (particularly reduced), which has a favorable effect on the functional readiness of the vehicle electronic system. In addition, the programming time for the overall vehicle is further reduced. Furthermore, by use of this on-board wiring system architecture, the possibility is obtained of retrofitting vehicle series, which were not yet developed with a CFFS switch, in a relatively simple and cost-effective manner by use of a wire tree change/expansion. The individual buses may also be provided with equipment options which are not part of the basic equipment of the vehicle, so that simple expansions are possible.

According to a preferred embodiment of the invention, the criteria priority includes the communication of the control device among one another as a first criterion; the utilization of the individual buses of the bus system during the data transmission as a second criterion; the data quantity to be maximally transmitted to an individual bus as the third criterion; and the placing-together of control devices with the same operating conditions as the fourth criterion.

The first criterion aims at the first priority of designing the on-board wiring system such that as little communication as possible is required by way of the central CFFS switch between the individual buses. The second criterion takes into account the utilization of the buses which occurs during normal communication, that is, in the normal vehicle operation. In this case, care is taken that, during idling, that is, in a defined normal condition, the bus utilization is as low as possible. In the case of the third criterion, the data quantity is taken into account which is to be transmitted to the individual bus in the worst case. Here, it is assumed that this worst case takes place during the data transmission (flashing) to all control devices on the individual bus. If it is assumed in this respect that in each case the total bandwidth of the bus is always only available to one control device, the duration for the flashing of all control devices on the bus should be approximately the same on all buses; that is, during the parallel flashing of the buses, should comprise a time period that is as identical as possible. Should it be found that (when the first two criteria have been met) a bus needs a disproportionately long time for flashing all connected control devices, this bus has to be multiplied and the control devices should be distributed such on the additional now existing buses such that, if possible, the identical flashing time has been reached for all buses.

Finally, the placing-together of all control devices sharing the same operating conditions takes place onto the same buses as the fourth criterion. The background for this criterion is the possibility of switching off certain buses which are not required for a certain operating condition, for example, an "infotainment" system (navigation device) when the vehicle is parked. This possibility of the partial network operation is achieved by the division of the control devices according to functional aspects. Here, the operation of the entire on-board wiring system is not constantly required but only the operation of individual buses, which saves energy and fuel.

According to another preferred embodiment of the invention, the bus system is constructed as a Controller Area Network (CAN) system. A Flex Ray System may also be provided. The bus system may also be constructed as an optical waveguide system.

The bus architecture of dividing the sub-networks according to a criteria priority sequence may be implemented particularly efficiently by means of a Controller Area Network (CAN) system, because CAN systems are available as relatively matured and easily adaptable systems. In addition, the concept can easily be expanded by buses newly conceived for vehicles, particularly the open Flex Ray bus system currently being developed. However, basically, other new types of sub-networks are also suitable. Particularly, high data transmission speeds can be achieved by means of an optical waveguide system, as used, for example, in the so-called MOST (Media Oriented Systems Technologies) bus. MOST buses are also distinguished by their high bandwidth, while the costs are relatively low.

According to another preferred embodiment of the invention, a timer is provided by which the control devices can be synchronously supplied with a central system time.

By means of the central timer, a system time is provided for all control devices, which supplies all control devices with an absolute time. This simplifies the functional testing of the on-board wiring system during production and, as required, the fault analysis during servicing. The timer can particularly be constructed as a Real Time Clock (RTC), which is supplied with energy by way of a capacitor unit, such as a Goldcap or a Supercap, or by way of a so-called lithium ion life time supply, as a rule, without maintenance.

The known methods of controlling control devices in an on-board wiring system of a motor vehicle have the above-described disadvantages.

It is, therefore, another object of the present invention to improve the known methods such that they permit a more effective data transmission between an external data transmission device and the control devices in a motor vehicle, as well as between the control devices within the on-board wiring system of the motor vehicle.

According to the invention, this object is achieved in that, by way of a multifunctional data transmission device, a plurality of control devices arranged in sub-networks of the on-board wiring system is addressed in a parallel manner with respect to time on the connected sub-networks.

As a result of the parallel data transmission by way of the data transmission device (CFFS switch) on all sub-networks connected directly to the CFFS switch, significantly shorter programming times are obtained, and time and costs are therefore saved when reading data into the control devices of the on-board wiring system. Furthermore, system diagnoses can be carried out more easily. In addition, an autoconfiguration of the on-board wiring system of the motor vehicle becomes possible.

According to a preferred embodiment of the invention, during update programming and/or during new programming of control devices, the data transmission device is first fed with data, and subsequently, the control devices to be programmed are programmed in a parallel manner on the sub-networks of the on-board wiring system.

During a new programming or an update programming of the on-board wiring system, the CFFS switch can be used particularly effectively. In this case, the parallel data transmission to the control devices of the buses takes place after a fast data feed to the CFFS switch. As a result, the time-consuming sequential programming of each individual control device by the tester by way of the access is eliminated.

According to a further preferred embodiment of the invention, a storage medium is first loaded with data, and, if required, the data of the storage medium, which is inserted in a storage medium receiving device of the data transmission device, are transmitted to the on-board wiring system.

As a result of the fact that a storage medium, for example, a data memory card, is first loaded, which is then inserted, as required, in the CFFS switch, the on-board wiring system can be addressed also at any time without a tester, for example, for transmitting personalized data. It is also contemplated, in the event of a partial failure of the on-board wiring system on the road, to be able to retrieve relevant data for an update in order to rapidly restore faulty important functions, whereby the safety of the availability of the on-board wiring system is increased.

According to another preferred embodiment of the invention, control device addresses assigned to the control devices are assigned on the sub-networks in multiple manners.

By addressing control devices on parallel-connected sub-networks, the possibility is created of allocating device addresses in multiple manners. For this purpose, the individual sub-networks are considered to be autonomous units, in contrast to the previous approach, where the entire vehicle was considered to be a unit. By means of this multiple allocation (for example, double allocation, of control device addresses on the sub-networks), on the whole, more control devices can be addressed directly. Particularly, in the case of the further increase of the number of control devices to be expected, a more effective data feeding of future on-board wiring systems can thereby be supported.

According to another preferred embodiment of the invention, by way of a wireless access of the respective data transmission device, the on-board wiring systems of several motor vehicles are simultaneously charged with data and/or diagnosed.

The possibility of the simultaneous programming of several vehicles opens up an additional potential for saving time in motor vehicle production.

Other objects, advantages and novel features of the present invention will become apparent from the following detailed description of the invention when considered in conjunction with the accompanying drawings.

DETAILED DESCRIPTION OF THE DRAWINGS

Figure 1:
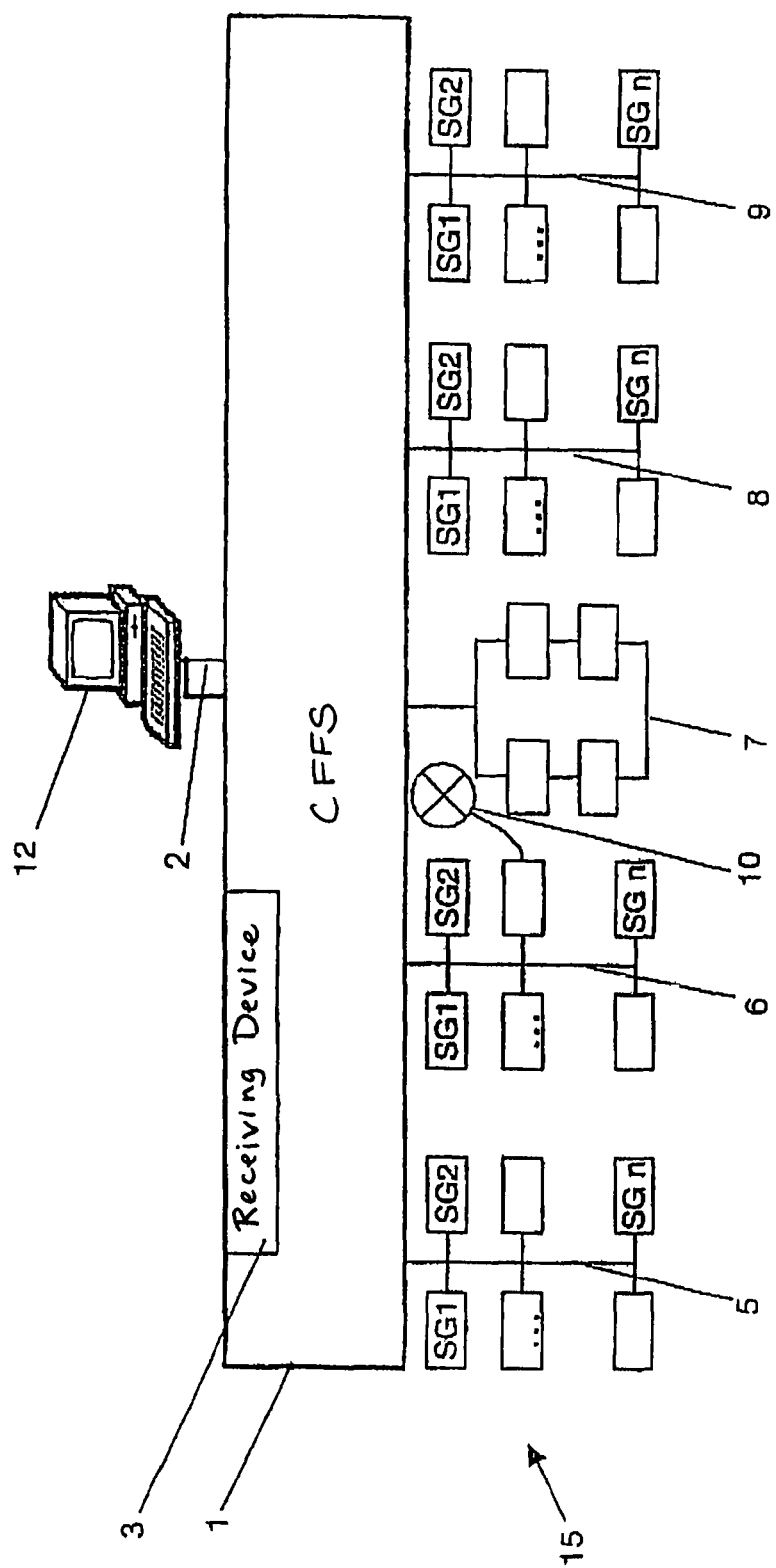
FIG. 1 is a schematic block diagram of a first embodiment of a CFFS switch arranged on an on-board wire system divided into sub-networks according to the invention.

An arrangement for controlling control devices SG1 to SGn in an on-board wiring system 15 of a motor vehicle essentially consists of a multifunctional data transmission device 1, by way of which several of the control devices SG1 to SGn arranged in sub-networks 5 to 9 of the on-board wiring system 15 may be controlled in parallel with respect to time.

The data transmission device represents a CFFS switch 1 to which a defined number of sub-networks are connected. For example, the existing control devices SG1 to SGn are distributed to five sub-networks 5 to 9. The CFFS switch 1 has a bidirectionally operating electronic distribution and switching system by which data, which are fed by way of an access or an interface 2, 2', 3, 4 by a tester 12, 12', are transmitted to the connected sub-networks. In this function, the CFFS switch 1 operates as a switch which distributes the data to the sub-networks 5 to 9 and addresses them from there by way of assigned control device addresses to the individual control devices, where they are, for example, written into a respective control device memory. Inversely, the CFFS switch 1 can also transfer data from the on-board wiring system 15, particularly for diagnostic purposes, by way of the access or the interface 2, 2', 3, 4 or an OBD box 14 to the tester 12, 12' or another connected diagnostic device. The CFFS switch 1 is preferably a circuit arrangement which offers expansion possibilities for the connection of additional sub-networks on the on-board wiring system side and additional interfaces or adaptation possibilities to a new interface on the tester side. Storage elements may also be provided as working memories for the intermediate storage of data or for storing certain preadjustments. For the scaling or expansion of power, processors or gate arrays can be exchanged or added.

Figure 3:
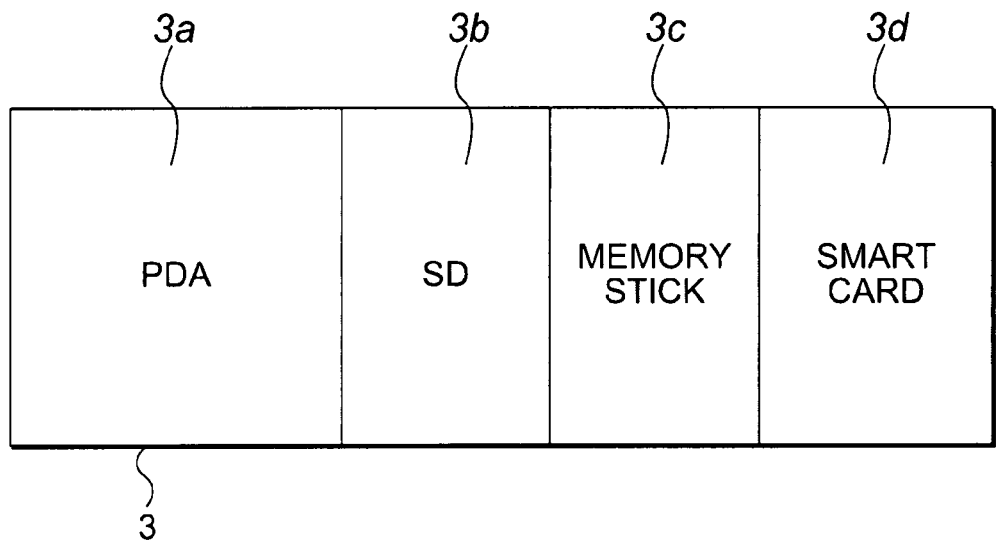
FIG. 3 is a schematic block diagram showing a detail of the receiving device according to an embodiment of the invention.
Figure 4:
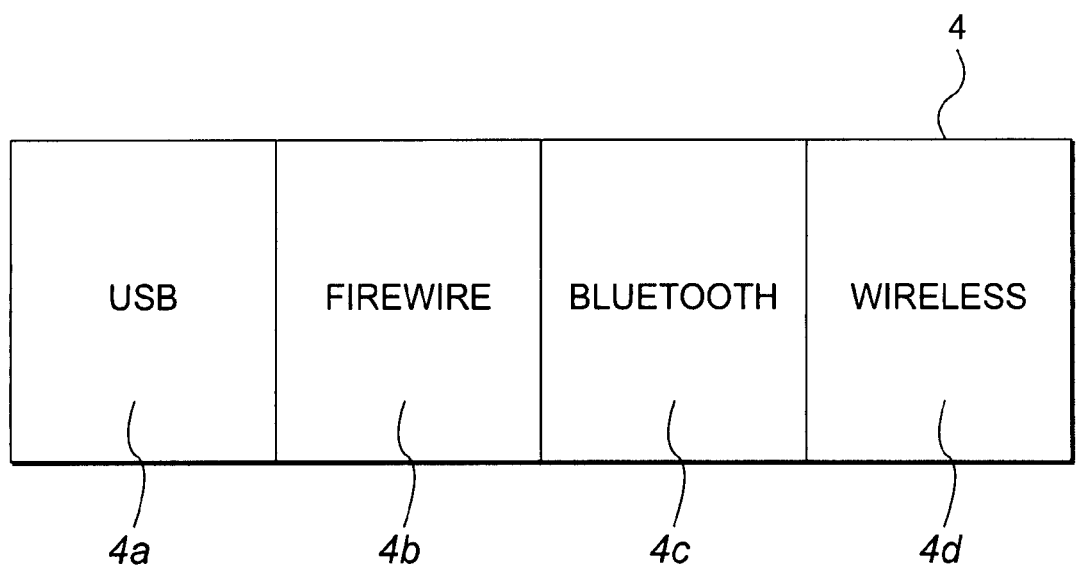
FIG. 4 is a schematic block diagram showing a detail of the interface according to an embodiment of the invention.

As shown in FIG. 3, an exemplary interface, such as the receiving device 3, may provide access for a PDA 3a, an SD card 3b, a memory stick 3c or a smart card 3d. FIG. 4 shows an exemplary interface 4 providing access for external devices via a USB port 4a, a Firewire port 4b, Bluetooth 4c and wireless access 4d.

A power scaling of the CFFS switch 1 preferably becomes possible by way of a dual port RAM, not shown here, with a corresponding linkage. Furthermore, for reasons involving the saving of energy, individual buses can be connected or disconnected at times or in certain operating situations, by way of the CFFS switch 1.

The architecture of the on-board wiring system 15 or of the bus system is advantageously designed according to the top-down principle with a criteria priority sequence, which results in a distribution of the control devices to a certain number of buses, which is favorable to a high data transmission speed and data transmission rate. For example, the five sub-networks or buses 5 to 9 are provided in a construction described in the following. The sub-networks 5 to 9 consist of buses which, by way of the CFFS switch, are connected to form a bus system. This bus system is advantageously a CAN system which forms the circuit-related basic structure of the on-board wiring system 15. The individual sub-networks 5 to 9 are connected parallel to the CFFS switch 1. They are constructed as individual CAN buses on which one group of control devices SG1 to SGn respectively is combined.

The sub-networks 5 and 6 form, for example, a first and a second K-CAN bus. As CAN buses, these buses are constructed with a plurality of control devices for central or peripheral vehicle body and comfort functions. A further division into more than two K-CAN buses is also possible. The sub-network 7, as a third bus, forms a so-called MOST (Media Oriented Systems Technologies) bus, which comprises the control devices or devices for multimedia applications, particularly audio and video systems, as well as navigation systems and telecommunication devices. This bus is advantageously constructed as an optical waveguide system with a high data transmission speed and a strictly hierarchical construction. A fourth sub-network 8 forms an SI (SI=Safety and Information) bus, in which safety-relevant and information-relevant control devices are combined. This bus may be constructed, for example, in the Byteflight7 technology, which is known per se. Another sub-network 9 forms a fast PT (power train) CAN bus, in which drive-relevant control devices are combined.

In a first embodiment (FIG. 1), the CFFS switch 1 is constructed with an access 2 for a conventional diagnostic or data transmission connection to a tester or to a diagnostic device 12. Furthermore, a storage medium receiving device 3 for a storage medium, for example, an insertion site for a data memory card, is advantageously arranged on the CFFS switch 1. In addition, a signalling device 10 is provided by which a successful data transmission may be indicated.

Figure 2:
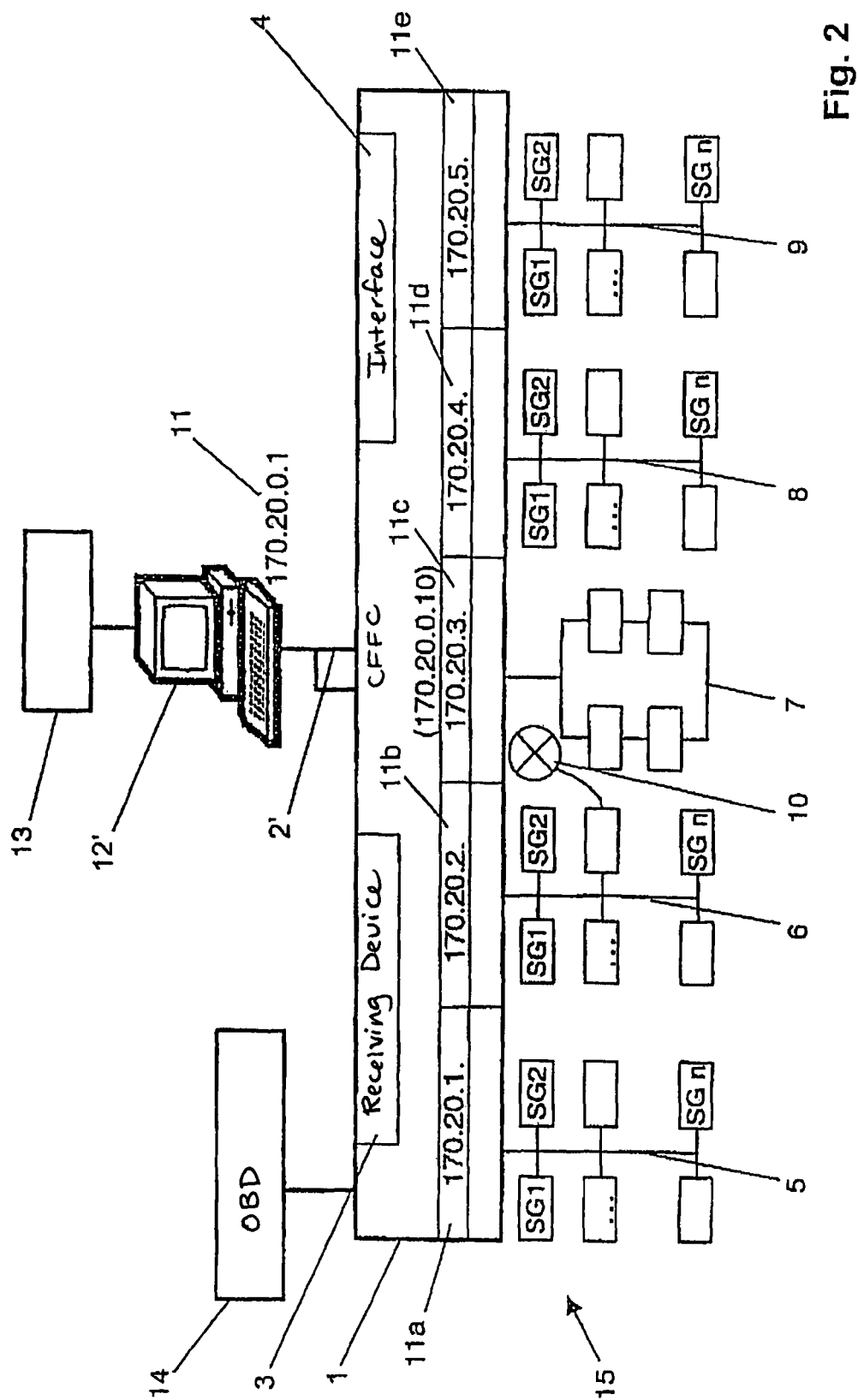
FIG. 2 is a schematic block diagram of a second embodiment of a CFFS switch with expanded access options according to the invention.

An access 2' is arranged in a second embodiment (FIG. 2) and is connected with a tester 12'. The access 2' is advantageously constructed as an Ethernet interface. As an alternative or in addition, an interface 4, which is, for example, constructed as an IEEE 1394 (Firewire) or as an USB2.0 interface, is provided for a particularly fast feeding of data to the CFFS switch 1. The access 2' may also be constructed as a wireless access, for example, according to WLAN or Bluetooth technology. The tester 12' may, for example, be a PC or laptop equipped with a suitable interface and having a (secure) Internet—or Intranet—connection 13. An IP (Internet Protocol) address 11 is assigned to the tester 12', by way of which address a simple connection can be established to the CFFS switch 1. A plurality of the control devices SG1 to SGn arranged in sub-networks 5 to 9 of the on-board wiring system 15 are temporally actuated in parallel on the connected sub-networks using a multifunctional data transmission system.

The method is, for example, carried out for an update of the control device software in the on-board wiring system 15 by use of the device described above. For this purpose, the data to be transmitted are first read into the CFFS switch 1. Subsequently, the connected sub-networks 5 to 9 are controlled in parallel by way of their assigned test addresses 11a, to 11e. Control device addresses are, in turn, assigned to the control devices SG1, SG2, . . . , SGn, by which addresses they are identified. The data read into the CFFS switch 1 are then distributed by use of the CFFS switch 1, are transmitted, and are written into the assigned memories of the control devices. In this case, several control device memories are written simultaneously. In this case, individual control device addresses may be allocated twice because the sub-networks 5 to 9 are addressed as autonomous sub-units by way of the test addresses 11a to 11e. The software update of the entire onboard wiring system 15 will then take place by the parallel programming on all directly connected sub-networks 5 to 9 during a significantly shortened programming time in comparison with the conventional programming which is serial with respect to time.

| Table of Reference Numbers | |
| --- | --- |
| 1 | Data transmission device/CFFS switch |
| 2, 2' | access |
| 3 | storage medium receiving device |
| 4 | interface |
| 5 | sub-network/bus |
| 6 | sub-network/bus |
| 7 | sub-network/bus |
| 8 | sub-network/bus |
| 9 | sub-network/bus |
| 10 | signalling device |
| 11 | IP address |
| 11a | test address |
| 11b | test address |
| 11c | test address |
| 11d | test address |
| 11e | test address |
| 12, 12' | tester |
| 13 | Internet connection |
| 14 | OBD connection |
| 15 | on-board wiring system |
| SG | control device |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for controlling control devices in an on-board wiring system of a motor vehicle, in which the on-board wiring system has a bus system comprising multiple sub-networks of buses, each of the sub-networks of buses further comprising a plurality of control devices for controlling operating sequences in the motor vehicle, and in which the plurality of control devices are controllable by way of at least one access to a data transmission with a test instrument via a multifunctional data transmission device connected to an input side of the bus system, the multifunctional data transmission device being adapted to distribute the data transmission to the multiple sub-networks by using a hierarchically-defined criteria priority, and being connected to the multiple sub-networks directly in parallel to control in a parallel manner with respect to time the plurality of control devices distributed on the connected multiple sub-networks, wherein the hierarchically-defined criteria priority includes a first criterion corresponding to communication of the plurality of control devices among one another, a second criterion corresponding to utilization of the sub-network of buses during the data transmission, a third criterion corresponding to the data quantity to be maximally transmitted to the sub-networks, and a fourth criterion corresponding to the placing-together of control devices with the same operating conditions.

2. The arrangement according to claim 1, wherein access of the data transmission device has at least one wire-bound interface.

3. The arrangement according to claim 2, wherein the at least one wire-bound interface is constructed as an Ethernet interface.

4. The arrangement according to claim 2, wherein the at least one wire-bound interface is constructed as a universal serial bus interface.

5. The arrangement according to claim 2, wherein the at least one wire-bound interface is constructed as a Firewire interface.

6. The arrangement according to claim 1, wherein access of the data transmission device has at least one wireless interface.

7. The arrangement according to claim 6, wherein the at least one wireless interface is constructed as a Wireless Local Area Network interface.

8. The arrangement according to claim 6, wherein the at least one wireless interface is constructed as a Bluetooth interface.

9. The arrangement according to claim 1, wherein the data transmission device has an on-board diagnostic access.

10. The arrangement according to claim 1, wherein at least one storage medium receiving device for a storage medium is arranged on the data transmission device.

11. The arrangement according to claim 10, wherein the storage medium is constructed as a data memory card, and further wherein the at least one storage media receiving device is constructed as an insertion site for the data memory card.

12. The arrangement according to claim 11, wherein the data memory card is constructed as a Compact Flash card, and further wherein the insertion site is constructed as a Compact Flash insertion site.

13. The arrangement according to claim 1, wherein a timer is provided by which the control devices are synchronously supplied with a central system time.

14. The arrangement according to claim 1, wherein, when certain operating conditions of the motor vehicle are present, individual sub-networks not required for these operating conditions are switched-off.

15. A method of controlling control devices in an on-board wiring system of a motor vehicle, the method comprising the acts of:
   addressing a plurality of control devices, disposed in multiple sub-networks of buses, for a control of operating sequences for a data transmission by use of a test instrument; and
   by way of a multifunctional data transmission device, adapted to use a hierarchically-defined criteria priority, distributing the data transmission to the multiple sub-networks by addressing, in a parallel manner with respect to time, the plurality of control devices arranged in the multiple sub-networks of buses, the multiple sub-networks forming a bus system of the on-board wiring system of the motor vehicle connected to the test instrument by way of the multifunctional data transmission device, wherein the hierarchically-defined criteria priority includes a first criterion corresponding to communication of the plurality of control devices among one another, a second criterion corresponding to utilization of the sub-network of buses during the data transmission, a third criterion corresponding to the data quantity to be maximally transmitted to the sub-networks, and a fourth criterion corresponding to the placing-together of control devices with the same operating conditions.

16. The method according to claim 15, wherein during update programming and/or during new programming of control devices, first the data transmission device is supplied with data, and subsequently the control devices to be programmed are programmed in parallel on the sub-networks of the on-board wiring system.

17. The method according to claim 16, wherein first a storage medium is written with data, and, as required, the data of the storage medium inserted in a storage media receiving device of the data transmission device are transmitted to the on-board wiring system.

18. The method according to claim 15, wherein control device addresses assigned to the control devices (SG1 to SGn) are allocated in a multiple manner on the sub-networks.

19. The method according to claim 15, wherein, by way of a wireless access of the respective data transmission device, the on-board wiring systems of several motor vehicles are simultaneously fed with data and/or diagnosed.

* * * * *